United States Patent [19]

Karlen et al.

[11] 4,249,098

[45] Feb. 3, 1981

[54] SQUIRREL-CAGE ROTOR STRUCTURE FOR AN ASYNCHRONOUS ELECTRICAL MOTOR

[75] Inventors: Urs Karlen, Fislisbach; Horst Kirschner, Birr, both of Switzerland

[73] Assignee: BBC Brown, Boveri & Company, Limited, Baden, Switzerland

[21] Appl. No.: 700,785

[22] Filed: Jun. 29, 1976

Related U.S. Application Data

[63] Continuation of Ser. No. 519,845, Oct. 31, 1974, abandoned.

[30] Foreign Application Priority Data

Nov. 15, 1973 [CH] Switzerland ............... 16099/73

[51] Int. Cl.³ ............................................. H02K 3/20
[52] U.S. Cl. .................................... 310/183; 310/211; 310/270
[58] Field of Search ............... 310/182, 183, 197, 211, 310/212, 261, 262, 264, 270, 271

[56] References Cited

U.S. PATENT DOCUMENTS

| | | | |
|---|---|---|---|
| 2,350,012 | 5/1944 | Brady | 310/211 |
| 3,134,040 | 5/1964 | Barth | 310/211 |
| 3,705,971 | 12/1972 | Jacouides | 310/211 |
| 3,793,546 | 2/1974 | King | 310/183 |

FOREIGN PATENT DOCUMENTS

299047 3/1954 Switzerland ............... 310/270
410148 10/1966 Switzerland ............... 310/270

OTHER PUBLICATIONS

Herstellung der Wicklungen Elektrischer Maschinen; H. Sequenz; Springer-Verlag; Vienna-New York; 1973.

*Primary Examiner*—R. Skudy
*Attorney, Agent, or Firm*—Burns, Doane, Swecker & Mathis

[57] ABSTRACT

A rotor component of an asynchronous electrical motor of the squirrel-cage type comprises a cylindrical array of circumferentially spaced short-circuited conductor bars having the opposite end portions thereof seated in corresponding circular grooves provided in the surfaces of annular conductive end rings. The ends of the conductor bars are soldered to adjoining surface portions of the grooves by placing solder in the gaps between the bar ends and groove surfaces and directly heating only the end rings so as to bring them up to the working temperature for effecting the soldering operation. The end rings are heated up circumferentially in a section-by-section manner so that soldering of the conductor bar ends to the end rings also takes place in a section-by-section manner.

1 Claim, 8 Drawing Figures

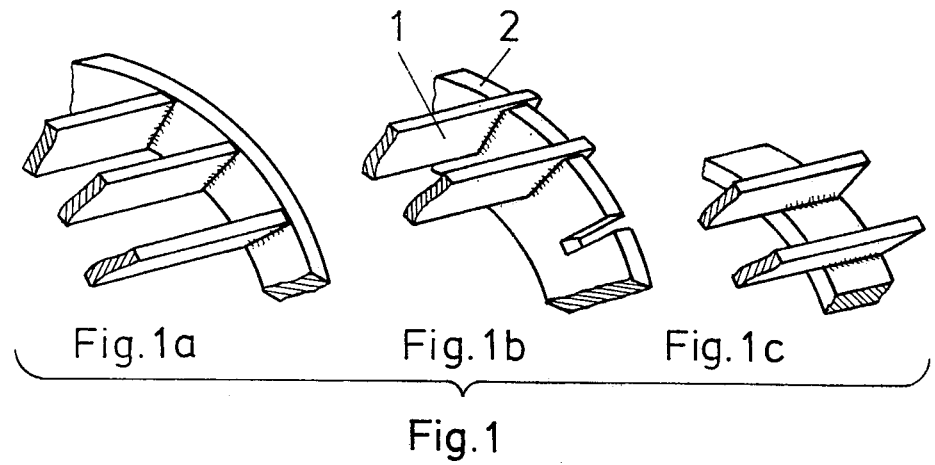
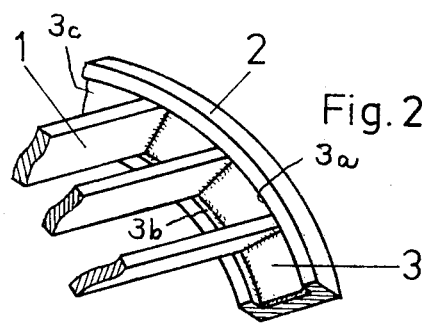
Fig. 2
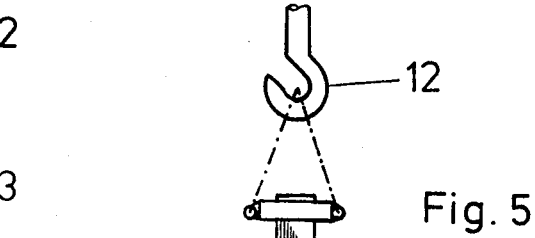
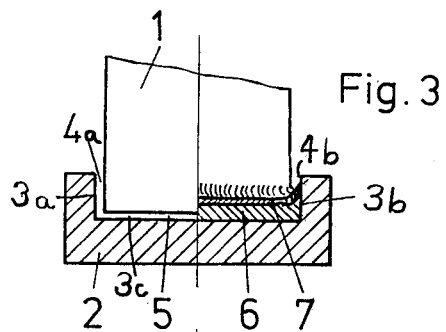
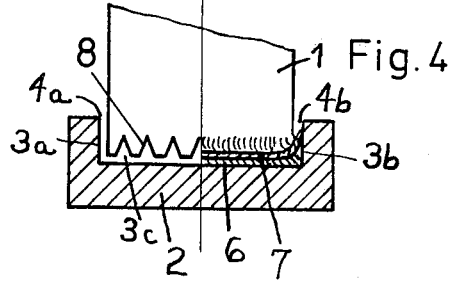
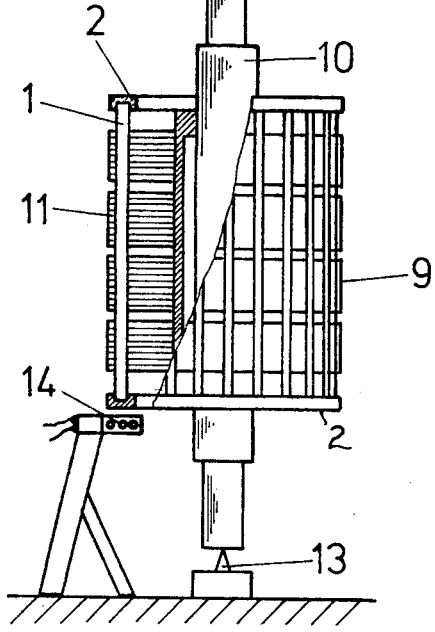

SQUIRREL-CAGE ROTOR STRUCTURE FOR AN ASYNCHRONOUS ELECTRICAL MOTOR

This is a continuation of application Ser. No. 519,845 filed Oct. 31, 1974, now abandoned.

The present invention relates to an improvement in the construction of the rotor component of an asynchronous motor, the rotor being of the well known squirrel-cage type comprising a cylindrical array of circumferentially spaced conductor bars having the opposite ends thereof short-circuited by soldered connections to electrically conductive end rings, the conductor bars themselves being clamped to an internal laminated iron core on the rotor.

By way of background information helpful to an understanding of the present invention, three different modes of making the soldered connection between the ends of the conductor bars and the end rings of the cage have been grouped together in the accompanying drawings under FIG. 1. FIG. 1a shows a soldered connection between the end face of the rectangular conductor bar and the adjoining flat side of an annular ring 2; FIG. 1b illustrates a different mode wherein the end ring 2 is provided with circumferentially spaced radially extending slots in which the end portions of the rectangular conductor bars are received and soldered; and FIG. 1c shows another mode wherein the narrow sides of the rectangular conductor bars overlap and are soldered to the outer periphery of the end ring.

Since the various types of soldered connections possess different mechanical and electrical characteristics there is the possibility that all three modes for making the connections will be used in the same plant, in order to meet various requirements, a procedure which is disadvantageous and uneconomical so far as design, construction and processing are concerned. Furthermore, these different modes of making the soldered connections have various disadvantages which are discussed briefly below.

FIG. 1a:
  a simple fillet joint at each side of the T-junction lacks sufficient rigidity.
  a fillet joint with seam capping on both sides requires costly machining of the ends of the conductor bars.
  an optimum soldering gap between the end ring and conductor bar requires neat facing of all surfaces.

FIG. 1b: costly machining of the slots in the end ring.

FIG. 1c: if there are requirements for greater strength, the relatively great width of the end ring, which is then necessary, results in a wide axial extension of the overall cage structure.

The three different modes of making the soldered connections have two serious disadvantages in common. First, it is not possible to place soldering material onto the soldering points prior to the process of actually making the joints, with the result that a uniform quality of the connections can only be maintained with great difficulty. Secondly, for the purpose of heating the soldering point, it is necessary to bring both work pieces up to the working temperature simultaneously, with the result that the conductor bars, due to their continuous rapid heat conduction, being usually made of copper, will suffer a loss in strength by soft annealing. Also, the bottom stacks of the laminated iron core, and the insulating layers therebetween will be subjected to unduly high temperatures.

The general objective of the present invention is to provide an improved mode for making these soldered connections which results in a more uniform soldering of all conductor bar ends and establishment of proper mechanical and electrical characteristics between the conductor bars and the end rings of the cage component of asynchronous motor rotor components, regardless of the various geometries of the components involved.

This objective is attained by providing the end rings of the cage with an annular surface in which recess means, preferably in the form of a circular groove, are provided for receiving the end portions of the conductor bars and there soldered in place, the soldering taking place primarily between the end faces of the conductor bars and the adjacent surface portions of the base of the groove. When the soldered connection is made, the entire profile at the end of the bar will come to bear mechanically as well as electrically. A three-fold safety is attained mechanically in that:

(a) the end portions of the conductor bars located within the recess of the end ring cannot lift radially from the cage during operation of the motor should there be a break at a soldering point.

(b) the soldering material bonding the two work pieces together, which adheres at least to the entire end profile of the conductor bars, possesses a greater strength than the work-piece itself.

(c) the conductor bars will operate substantially stress-free at the rated speed of the asynchronous motor.

An important simplification will be attained by designing the conductor bar end receiving recess in the form of a circular groove. This requires only a simple lathe operation at the time the end rings are being machined, and it can be produced without requiring a change in work mounting. This groove can also serve for centering of the cage on the internally located rotor structure including the shafting thereof.

The end faces of the conductor bars which actually form the soldering gap between the end ring and conductor bars do not need to be planar but rather can advantageously have a non-planar surface, e.g. a toothed profile which results in an increase in the effective soldering surface area, enhancing of the quality of the soldering seam due to a better outflow of the soldering flux from the soldering junction, and finally a substantial saving in soldering material itself.

In accordance with the invention, the improved soldering connections can be made by bringing the end ring of the cage up to the working temperature by a source of heat, whereupon the solder-material, e.g. silver solder, will melt and fill the gaps between the end faces of the conductor bars and the adjoining surface portions of the end ring, heating up the bar ends to the working temperature.

The indirect heating of the end portions of the conductor bars which are subjected to the working temperature for only a short time preserves the original temper of the bar material and particularly at the points where the bar is clamped to the iron core of the rotor. At this point, which controls the dimensions of the bar profile, there will be guaranteed a practically full strength of the material. Also, no heat-related damage to the insulation layers incorporated in the laminated stacks which form the iron core will occur.

If the soldering operation is made to take place with the conductor bars in a vertical attitude, a pre-weighed quantity of the soldering material and flux can be applid to the end ring of the cage in a simple and advantageous manner. Also, by using a generally applicable, transportable source of heat, it is possible to carry out the soldering operation at any desired location because the conductor bars can be placed in a vertical position simply by suspending the asynchronous rotor structure from a hoist, to give an example.

Heating of the end rings of the squirrel-cage can be accomplished advantageously by the use of induction heating. Since this type of heating permits great concentration i.e. localization of thermal output, the soldering operation will be improved substantially in quality as well as time-wise. Also, the soldering operation can be performed by essentially non-skilled workers because the operation itself does not present any problems.

It is further advantageous to heat the end ring of the squirrel-cage structure up to the working temperature required for the soldering operation in a section-by-section manner so that only a few of the conductor bar ends within the heated zone will bond with the soldering material. Even very large-sized work pieces can be processed in this manner and without any adverse affect on the uniformity of all soldered seams. Due to the very restricted, partial heating, a relatively low soldering capacity will be required, thereby keeping down the capital expenditure for the source of heat.

The apparatus for carrying out the improved mode of soldering the conductor bar ends to the end rings of the cage features a source of heat, e.g. a heater of the surfaces induction type applied to a peripheral section only of the entire circumference of the end ring which together with the remaining components of the rotor is suspended on a vertical axis, the ends of the conductor bars engaging in recess means, preferably in the form of a circular groove, provided in the end ring, and in which is placed a measured quantity of solder material and flux. As each peripheral section of the end ring is heated, the soldered connections are completed for the comparatively small number of conductor bar ends in that section after which the rotor is turned on its axis so as to bring the next section of conductor bar ends into the influence of the induction heater, and so forth until all of the conductor bar ends around the complete circumference of the end ring have been soldered to it.

The improved mode of making the soldered connections between the conductor bar ends and the end ring in accordance with the invention will now be described in further detail and is illustrated in the accompanying drawings. As to these, FIGS. 1a to 1c have already been referred to in conjunction with the preceding comment concerning background information leading up to the present invention.

FIG. 2 is a perspective view showing a peripheral section of an annular flat-sided end ring of the rotor cage together with the end portions of several conductor bars inserted in a circular groove provided at the inner side of the ring and soldered into place;

FIG. 3 is a radial section through the end ring of the cage, the left half showing a planar conductor bar end prior to soldering and the right half showing the bar end upon completion of the soldering operation;

FIG. 4 is a radial section through the end ring of the cage similar to FIG. 3 but illustrating a modified profile for the entire length of the end face of the conductor bar in the form of tooth-like serrations; and FIG. 5 is a somewhat schematic view partly in elevation and partly in section illustrating one practical manner in which the squirrel-cage rotor structure can be suspended in a vertical attitude and in association with a heating device for carrying out the soldering operation.

With reference now to the drawings, FIGS. 1a to 1c have already been discussed but in order to facilitate comparison between these views and FIG. 2, the same numerals have been used to designate an end ring 2 of the cage and the conductor bars 1 the end faces of which are to be soldered to the end ring.

Coming now to the improved mode of making the soldered connections as depicted in FIG. 2, it will be seen that the inner planar face of the annular end ring 2 is provided with a circular groove 3 which can be easily machined into the ring at the same time that other machining operations on the ring take place, i.e. without having to re-mount the ring on the lathe for the special purpose of forming the groove. With reference to FIG. 3 it will be seen that in setting up the work, a gap 4a exists between one narrow edge portion of the bar end and the adjoining flank 3a of groove 3, and another gap 4b exists between the opposite narrow edge portion of the bar end and the opposite flank 3b of the groove. Still another gap 5 exists between the planar end face of the conductor bar 1 and the base 3c of the groove and it is this gap that provides the principal soldering connection between the bar 1 and end ring 2. Since the soldering material used for bonding the two work pieces 1 and 2 together possesses a greater strength than the work pieces themselves, e.g. the solder is usually silver and the bars and end ring copper, there is no need for a tight fit i.e. essentially face-to-face at the soldering connection. However, in order to minimize the amount of solder required for the overall operation, gaps 4a, 4b and 5 should be held to a minimum but in due consideration of the fact that the end ring 2 undergoes radial expansion during the heating up process. The completed soldered connection is shown in the right half of FIG. 3 which is characterized by the soldering material 6, e.g. the mentioned silver solder partially filling the groove 3 and forming solder fillets along the gaps 4a, 4b and 5 as well as formation of a solidified layer of flux 7 above the solder 6 within the groove.

FIG. 4 is similar to FIG. 3 except that the entire length of the end face of conductor bar 1 has a tooth-like profile, the teeth 8 having a truncated configuration, thus providing a greater amount of filler at the soldering point whereas the groove 3 is filled to a much lesser degree. This embodiment for the soldering zone thus results in a high-quality soldering connection at a saving of more than 50% of solder material as compared with FIG. 3. However, profiling of the conductor bar ends as in FIG. 4 constitutes an added cost factor as compared with the planar configuration of the bar end in FIG. 3.

With reference now to FIG. 5, only those components essential to an understanding of the invention have been included in the somewhat schematic presentation. The rotor 9 of the asynchronous motor is seen to be comprised essentially of a shaft 10, a laminated iron core 11 and the short-circuited squirrel-cage which is constituted by the two copper end rings 2 and the cylindrical array of circumferentially spaced copper conductor bars 1. Vertical placement of the rotor 9 is accomplished most simply by suspending the upper end of the shaft 10 from a crane hook 12 and centering the lower end of the shaft for rotation of the rotor about its now vertical axis by means of a conical bearing 13. The rotor 9 can now be easily turned about its axis in a step-bystep manner either manually, or automatically by an appropriate driving apparatus, not illustrated, when a source of heat such as inductor 14 is utilized such that one section of the periphery of the end ring is heated up at one time, thus heating up only a few, e.g. from two to four conductor bar ends and soldering these before advancing to the next section to be heated and soldered.

The following procedure is used in making the soldered connections between the bar ends and each end ring of the squirrel-cage rotor.

In order to obtain equidistant spacing between the flanks 4a, 4b of groove 3 and the adjoining faces of conductor bar 1 it will be necessary to make allowance for heat expansion of the end ring 2 of the squirrel cage during the heating up process. This can be accomplished by making the radially outer gap 4a formed between the radially outer flank 3a and the adjoining face portion of the conductor bar smaller than the radially inner gap 4b formed between the radially inner flank 3b and the adjoining face of the conductor bar. An outer gap width of almost zero is the best arrangement at the time of insertion of the bar into the groove because this will enable a good balancing of the squirrel-cage in the cold state and because there is exerted a capillary attraction on the liquidized solder on both sides. The solder material in wire or sheet form, or in the form of filings, together with the flux 7 are placed in pre-measured quantities into the groove 3 when the rotor 9 reaches the soldering position, i.e. when the shaft 10 of the rotor is upright as depicted in FIG. 5.

The soldering point is preferably heated by use of a water-cooled surface type electrical inductor which is supplied with electrical energy from a not illustrated medium frequency generator. The inductor which can be utilized for soldering of the squirrel-cages of asynchronous rotor of any size, is designed for an output that will be sufficient for even the most heat-consuming connections. This has the advantage that components of squirrel-cages of smaller cross sectional areas can be heated, in order to save time, at maximum output capacity of the inductor just below the liquifying temperature of the solder material, with soldering then being accomplished at such output as required for maintaining the working temperature which is just above the liquifying temperature of the solder material.

Only the end ring 2 of the cage is heated directly by induction currents, and if the geometry of the soldering point is designed and arranged properly, the gaps 4a, 4b between the adjoining narrow sides of the conductor bars, which have an elongated rectangular configuration, and the flanks 3a, 3b of groove 3 will be equal in width at the working temperature following heat expansion of the end ring 2.

The melting solder material 6 will fill the soldering gap 5, will wet the adjacent surface portion of the end portions of the conductor bars 1, and will be subject to capillary ascension within the gaps 4a, 4b. The flow of heat from the solder melt to the end portions of the conductor bars will heat up the latter to working temperature, and when this temperature level has been reached, solder components will diffuse into the material of the conductor bar, thus accomplishing the bonding. The soldering operation is complete when a clean fillet has formed between the solder melt and conductor bar. During the liquifying and bonding phase, a strong whirling motion will occur in the solder melt due to the emergence of the flux 7, which possesses a lesser density, from the melt as well as from the gaps 4a, 4b and 5, and this motion terminates only after a complete separation of the flux 7. The specific design of the end faces of the conductor bars, as illustrated in FIG. 4 facilitates advantageously an outflow of the flux. An encasement of flux in the soldering seam will occur, if at all, only at the peaks of the teeth. This is accomplished because the strongly wetted silver solder will fill the spaces between the teeth up to the center, and the flux will not find any hold on the small links forming the actual soldering gap, nor on the steep sides of the teeth.

As each section of the periphery of the end ring 2 is soldered to the ends of the conductor bars, it is removed from the effective range of the inductor heat source 14 by turning the rotor about its axis. The soldering material will set when its solidification temperature is reached during a cooling-off phase, and when the temperature has been further lowered the flux will harden and form a thin, brittle crust-like layer which can be easily removed by tapping or washing.

In order to solder the end portions of the conductor bars to the end ring of the cage, the latter is moved section-by-section through the heating zone until a full revolution is completed. The rotor unit is then permitted to cool, with the cage contracting again in a radial direction. The soldered ends of the conductor bars follow by force this radially inward motion, and the conductor bars are thereby placed at the points of insertion into a state of tension which is close to the yield strength of the material. This stress is an advantageous feature because it will be almost fully compensated for during operation of the asynchronous motor at its rated speed by the centrifugal forces as well as by the thermal stresses.

Due to the partial heating of the end ring of the rotor cage which is restricted to one small arcuate section at a time, a feature which is feasible only by high concentration of the inductor output, the soldering operation is accomplished very rapidly, subjecting the ends of the conductor bars 1 to be soldered at the working temperature of approximately 650° C. for a brief period of time only. Also, since the soldering operation is accomplished rapidly, the temperature at the points where the conductor bars are clamped to the iron core will not exceed 150° C., thus avoiding any soft-annealing effect of the material. This is particularly important because the clamping point controls the dimensioning of the conductor bars due to the deflection of the bars during shrinkage of the cage as well as the operational stresses. The specifications for the conductor bar profile required can be based almost fully on the hardness factor of the copper itself, and the heretofore over-dimensioning of the conductor bars, in view of the soft state of the material at the critical point because of prolonged annealing, will no longer be necessary.

Conduction of heat from the conductor bars by way of the points of clamping to the core exposes the lowest laminated stacks in the core most strongly to thermal stresses. The insulating layers, located between the laminations 11 often partially carbonized heretofore, an occurrence which had to be accepted, are now no longer subjected to damaging temperatures, another point of merit inherent in the improved soldering technique in accordance with the invention.

Although utilization of a circular groove in the end ring for receiving the ends of the conductor bars is preferred because of its many cost-saving advantages, various modifications of details are possible in that the required recesses for receiving the conductor bar ends can take the form of a blind hole, as an example.

Moreover, even when a circular groove is utilized, the transition within the groove from the flanks to the base can be rounded rather than sharply cornered. In this manner it becomes possible to effect some saving in solder material.

Also, for example, should it become more desirable to effect soldering of squirrel-cage rotors in mass production, it is possible to utilize an annular inductor which matches the annulus of the end ring of the cage, thereby enabling all soldering junctions around the periphery of the ring to be made simultaneously.

Moreover, sources of heat other than that developed by inducing current flow within the work pieces can be used such as heat produced by electric resistance heating or flame-producing burners.

We claim:

1. In a rotor component of an asynchronous electrical motor, said rotor being of the squirrel-cage type comprising a cylindrical array of circumferentially spaced rectangularly configured conductor bars having the opposite ends thereof short-circuited by connection to electrically conductive end rings and wherein the conductor bars are also secured to a laminated iron core on the rotor, the improvement wherein each end ring has an annular configuration provided with an annular groove receiving the corresponding end portions of the conductor bars, the end faces of said conductor bars having a tooth-like profile throughout the length thereof, and hard solder connections joining the base of said groove to said end faces and also joining the flanks of the groove to the adjacent side faces of the conductor bars.

* * * * *